US010650431B1

(12) United States Patent
Ben Shahar

(10) Patent No.: US 10,650,431 B1
(45) Date of Patent: May 12, 2020

(54) SYSTEM, METHOD, AND COMPUTER PROGRAM FOR A CATALOG DRIVEN USER EXPERIENCE

(71) Applicant: Amdocs Software Systems Limited, Dublin (IE)

(72) Inventor: Tal Ben Shahar, Tel-Aviv (IL)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 854 days.

(21) Appl. No.: 14/605,816

(22) Filed: Jan. 26, 2015

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0603* (2013.01); *G06Q 30/0643* (2013.01)

(58) Field of Classification Search
CPC ........... G06Q 30/0631; G06Q 30/0603; G06Q 30/0643; G06Q 30/0641
USPC ...................................... 705/26.7, 27.1, 27.2
See application file for complete search history.

(56) References Cited

U.S. PATENT DOCUMENTS

2011/0271175 A1* 11/2011 Lavi ................... G06F 16/9577
715/234
2014/0195388 A1* 7/2014 Scott .................. G06Q 30/0621
705/27.2
2015/0112807 A1* 4/2015 Muppirala ......... G06Q 30/0251
705/14.56

OTHER PUBLICATIONS

Coveo Launches Enterprise Search-based, B2B Customer Service and Call Center Solution, Oct. 19, 2009, Business Wire (Year: 2009).*

* cited by examiner

*Primary Examiner* — Brittney N Miller
(74) *Attorney, Agent, or Firm* — Zilka-Kotab, P.C.

(57) ABSTRACT

A system, method, and computer program product are provided for a catalog driven user experience. In use, one or more products to present utilizing at least one user interface are identified, the one or more products being defined in at least one product catalog including a plurality of products associated with at least one service provider. Additionally, user experience criteria information associated with the one or more products is received, the user experience criteria information including at least one definition of how the one or more products are to be presented utilizing the at least one user interface, the at least one definition of how the one or more products are to be presented utilizing the at least one user interface being one of a plurality of dynamically selectable definitions defined in the at least one product catalog and being associated with at least one of a plurality of usability properties. Further, the one or more products are presented utilizing the at least one user interface based on the at least one definition of how the one or more products are to be presented and at least one of the plurality of usability properties.

3 Claims, 4 Drawing Sheets

US 10,650,431 B1

SYSTEM, METHOD, AND COMPUTER PROGRAM FOR A CATALOG DRIVEN USER EXPERIENCE

FIELD OF THE INVENTION

The present invention relates to service providers and more particularly to defining user experiences associated with user interface applications of such service providers.

BACKGROUND

Usability is a major topic today in every user interface application. User experience is expected to be optimal considering the product negotiated, the user, the channel, the particular situation, and more.

Currently, user experience related updates require development. Service providers may need to wait for a software deployment (which typically happens every few months) in order to implement different user experiences, even when there are small changes to existing experiences.

This issue is even worse since new product and product updates can be introduced without software changes using the product catalog (i.e. different lifecycles).

There is thus a need for addressing these and/or other issues associated with the prior art.

SUMMARY

A system, method, and computer program product are provided for a catalog driven user experience. In use, one or more products to present utilizing at least one user interface are identified, the one or more products being defined in at least one product catalog including a plurality of products associated with at least one service provider. Additionally, user experience criteria information associated with the one or more products is received, the user experience criteria information including at least one definition of how the one or more products are to be presented utilizing the at least one user interface, the at least one definition of how the one or more products are to be presented utilizing the at least one user interface being one of a plurality of dynamically selectable definitions defined in the at least one product catalog and being associated with at least one of a plurality of usability properties. Further, the one or more products are presented utilizing the at least one user interface based on the at least one definition of how the one or more products are to be presented and at least one of the plurality of usability properties.

DETAILED DESCRIPTION

Figure 1:
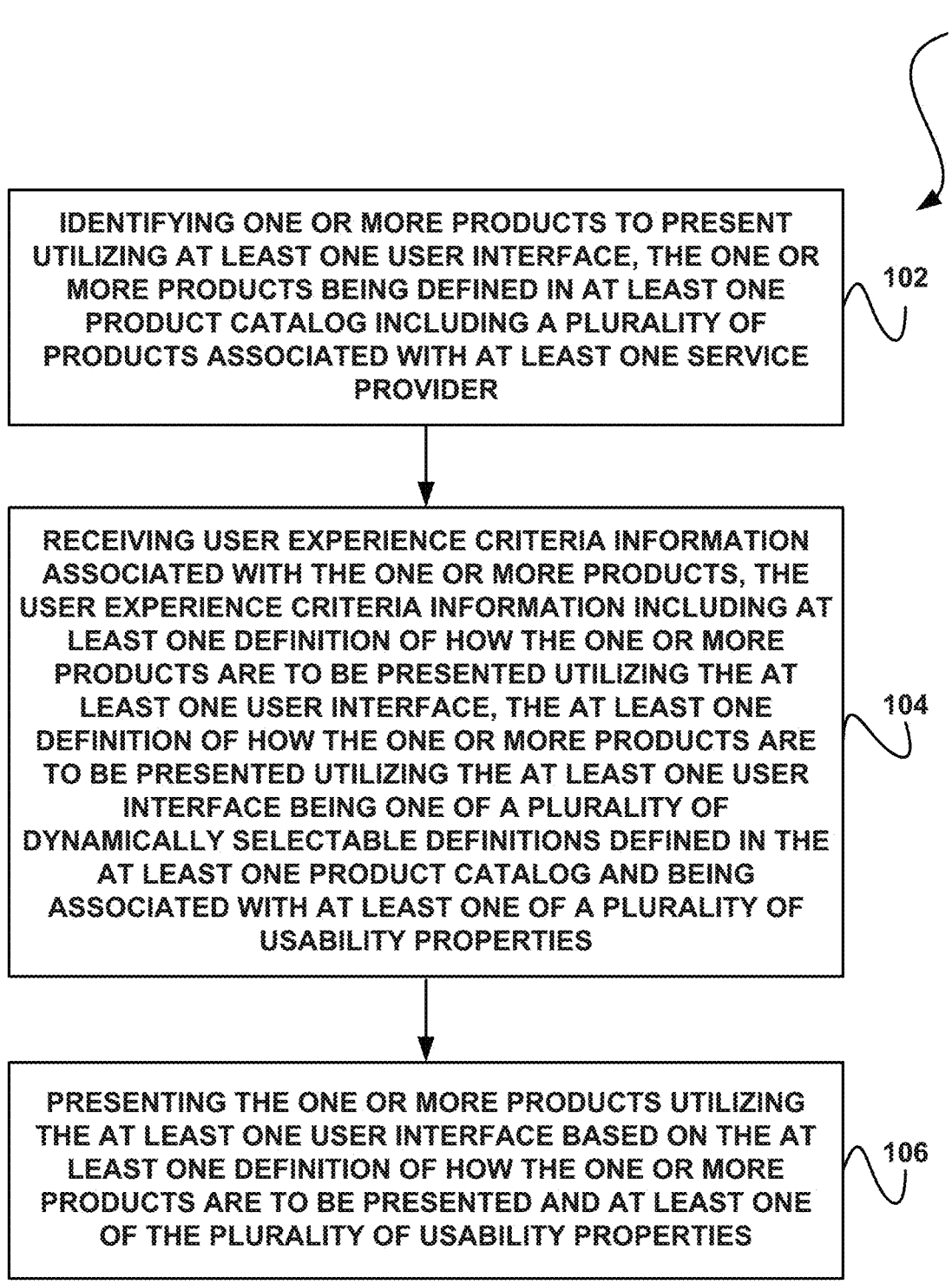
FIG. 1 illustrates a method for a catalog driven user experience, in accordance with one embodiment.

FIG. 1 illustrates a method 100 for a catalog driven user experience, in accordance with one embodiment.

As shown, one or more products to present utilizing at least one user interface are identified. See operation 102. The one or more products are defined in at least one product catalog including a plurality of products associated with at least one service provider.

The products may include any product, service, or groups of products and/or services. The service provider may include any type of product provider and/or service provider. For example, the service provider may include a communication service provider.

Additionally, user experience criteria information associated with the one or more products is received. See operation 104. The user experience criteria information includes at least one definition of how the one or more products are to be presented utilizing the at least one user interface. The at least one definition of how the one or more products are to be presented utilizing the at least one user interface is one of a plurality of dynamically selectable definitions defined in the at least one product catalog and is associated with at least one of a plurality of usability properties. The user experience criteria information may be selected utilizing one or more user interfaces.

Further, the one or more products are presented utilizing the at least one user interface based on the at least one definition of how the one or more products are to be presented and at least one of the plurality of usability properties. See operation 106.

The product catalog may include various predefined definitions in which a user configuring a product page, etc., may use to present the products. Each of the definitions may be dynamically selectable and may be associated with various properties associated with usability.

For example, in one embodiment, the usability properties associated with the definition may include properties associated with grouping the products (e.g. on a user interface/web page displaying the products). In this case, the properties associated with grouping the products may allow a user to change a default presentation of the products on the user interface.

In another embodiment, the usability properties associated with the definition may include properties associated with defining a spotlight item or product of the products. In this case, the properties associated with defining the spotlight item of the products may allow a user to spotlight a component or attribute in the user interface for a predefined situation (e.g. at a particular stage in product selection, etc.).

In another embodiment, the usability properties associated with the definition may include properties associated with defining a presentation of at least one of the products based on a relevancy to a particular action. In this case, the properties associated with defining the presentation of the products based on the relevancy to the particular action may include presenting first information associated with the products that are relevant to the particular action first and presenting second information by request. This may be referred to as an 80/20 concept, described in further detail below.

In another embodiment, the usability properties associated with the definition may include properties associated with one or more catalog rules. In this case, the properties associated with the catalog rules may enable calling of rules validation for part of a configuration associated with the products or for bypassing of rules for the products according to a particular channel (e.g. a call center channel, a sales center channel, etc.) or a particular action. For example, rules may be defined in the catalog to validate and update data according the catalog definition and the user selection.

In another embodiment, the usability properties associated with the definition may include properties associated with displaying selectable groups. In this case, the properties associated with displaying selectable groups may allow displaying products that must be selected as a group.

In another embodiment, the usability properties associated with the definition may include properties associated with defining a guided flow through steps associated with the products. For example, the guided flow may define which step the products or associated attributes are to be presented utilizing the user interface.

In another embodiment, the usability properties associated with the definition may include properties associated with launching external computer programs (e.g. widgets, etc.). In this case, the properties associated with launching the external computer programs may define when to launch computer programs external to the user interface.

In yet another embodiment, the usability properties associated with the definition may include properties associated with in-context validation of information associated with the products. In this case, the in-context validation of information associated with the products may function to update configurations of presentations of the products to ensure a user correctly configures a particular product.

In still another embodiment, the usability properties associated with the definition may include properties associated with prerequisite information that indicates dependencies between the products presented utilizing the user interface.

A user may select any of these usability properties/definitions as needed from the catalog and the configuration changes may be immediately applied. Thus, the method 100 may be used to drive basic user experience changes from a service provider catalog and allow quick deployment of such changes (i.e. drive usability concepts). This allows communication service providers to provide a better user experience and to update user experiences based on a new product launch without customization or waiting for a new software release.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
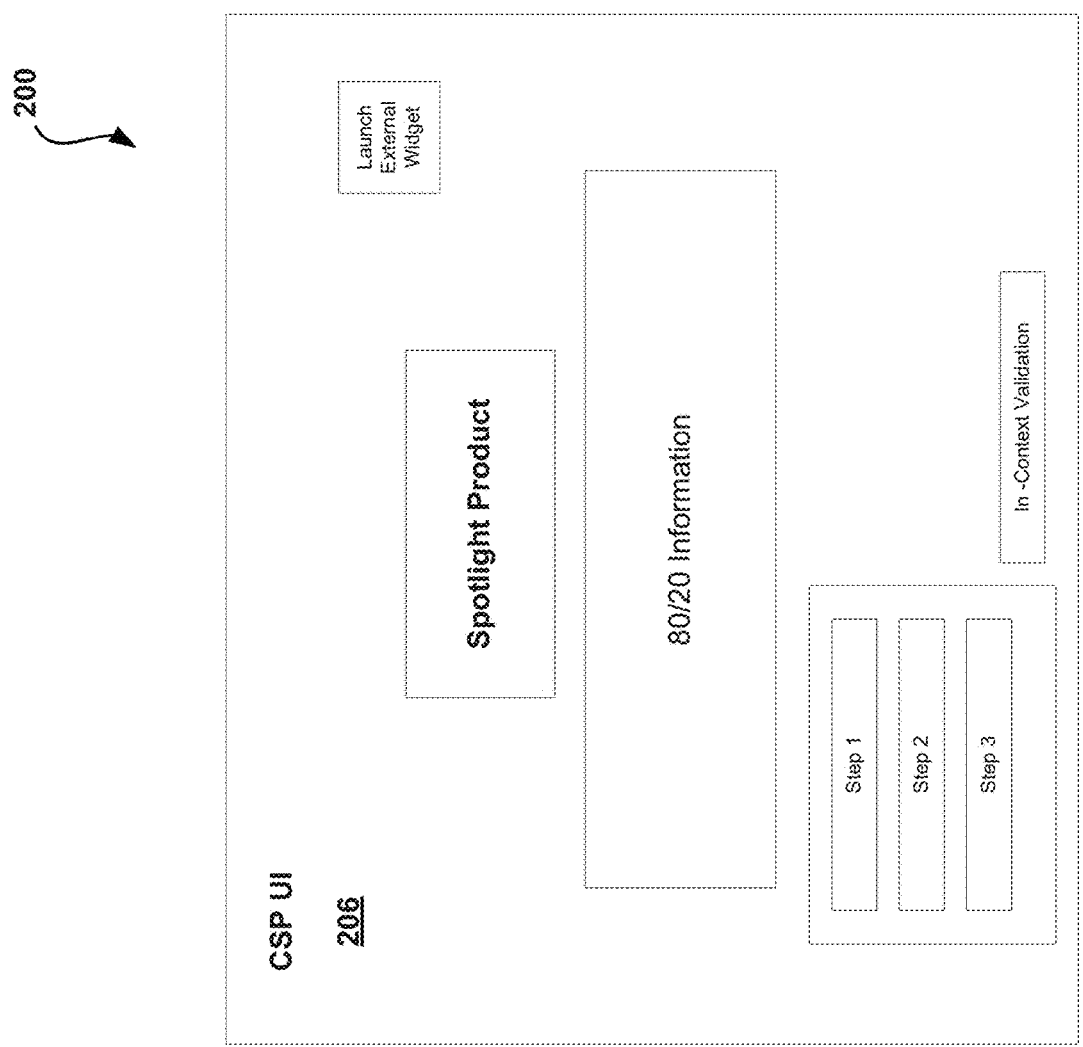
FIG. 2 illustrates a system for a catalog driven user experience, in accordance with one embodiment.
Figure 2:
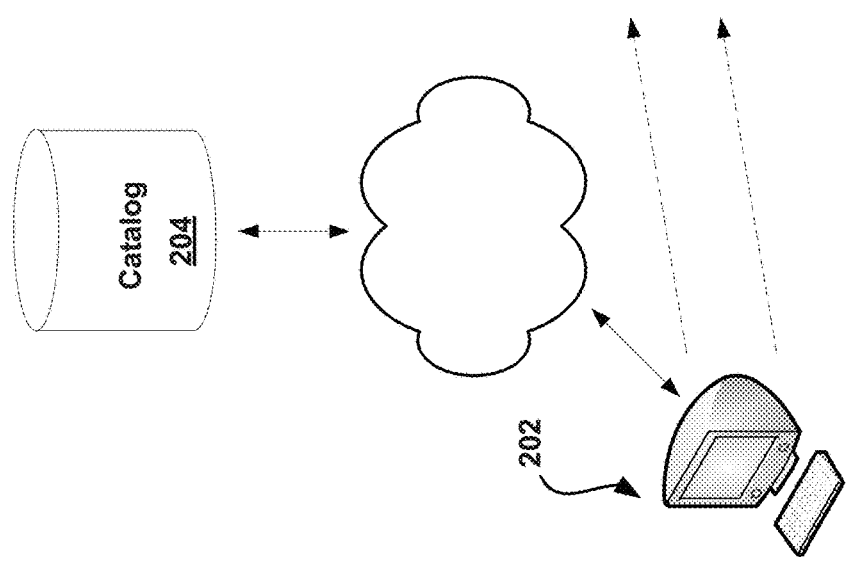

FIG. 2 illustrates a system 200 for video management orchestration, in accordance with one embodiment. As an option, the system 200 may be implemented in the context of the details of FIG. 1. Of course, however, the system 200 may be implemented in the context of any desired environment. Further, the aforementioned definitions may equally apply to the description below.

In operation, a user utilizing a device 202 may access a catalog 204 (e.g. over a network, locally, etc.) to configure one or more user experience screens 206 associated with various products (e.g. which a customer may view utilizing various devices over a network, etc.). The system 200 provides a way for a communication service provider to specify which type of experience they wish to have for any item defined in the product catalog 204, using properties. A set of possible experiences is pre-defined in software and available in the product catalog 204 so the user can choose various usability configurations/experiences.

The user may define various properties per channel (i.e. per call center, sales center, etc.) for each catalog item. For example, the user may utilize the system 200 to define how the user interface 206 presents certain groups of items. In this case, for each item, the user may use the system 200 to change the default presentation and present items/attributes under different items/levels.

One of the major usability issues today is due to the close link between the catalog tree and the way it presented. The system 200 diminishes this link to allow better usability. In the catalog 204, the user may define which specific item should be presented in the user interface 206 with other items/attributes.

For example, the catalog 204 may define that a component is to be presented under another component in the same hierarchy or another hierarchy. In this case, an attribute associated with an item may be presented under a particular component (e.g. in the same hierarchy only, etc.).

As another example, the user may utilize the system 200 to define a spotlight item. For example, the user interface 206 may spotlight a component or attribute in certain situations. These situations may include, for example, business cases such as highlighting the bandwidth attribute in a data component, or highlighting the family component when selecting a family offering.

The catalog 204 may allow a user to indicate which items are highlighted in which situation such as: when an item is just added (selected); when an item is available, but not added (unselected); when an item is updated (e.g. a value change); when an item is removed; and/or when an item is assigned and no action is performed. The user interface 206 may deploy the highlight as bold, large font, or in various other ways.

As another example, the user may utilize the system 200 to define an 80/20 concept/quick setting. In the case, the user interface 206 may present the items which are relevant to the action first and present the rest of the information by request.

For example, there are many catalog items (e.g. components, attributes) that are not relevant ~80% of the time. The 80/20 concept includes presenting only the information (~20%) which is relevant and most likely to be updated according to the action being performed by the user. Thus, only a highlight may be presented at first and a button on the user interface 206 may be pressed for more details.

The 80/20 concept may be utilized on any catalog item such as a component, attribute, and/or billing offer. Depending on the situation, an item may have a different 80/20 value or priority.

The system 200 allows the implementer to define in the catalog 204 for each item if it is part of the 80% or the 20% and rank the item. In one embodiment, the same mechanism may be used to rank and decide the 80/20. For example, ranking 1-10 may be part of the 20% (i.e. present upfront to the user) and ranking 11 or greater may be part of the 80%.

Some ranking may also be implemented as hardcoded rules and may be defined by the design and usability (e.g. items that are just added will always be in the 20%, etc.).

As another example, the user may utilize the system 200 to define catalog rules. Rules may be defined in the catalog 204 to validate and update data according the catalog definition and the user selection. In certain situations, rules may be bypassed fully or partially.

For example, rules may be checked or bypassed based on business parameter values. In this case, for full validation, all the relevant rules will be executed. For full bypass, no rule will be checked (e.g. sales person may wish to provide first quick configuration, etc.). In the case the rules are bypassed, the hosting application may be responsible to ensure all validation is done before an order is submitted.

As another example, the user may utilize the system 200 to define a selecting group. This may allow a user to indicate in the user interface 206 the items to be selected up-front. In this case, the user interface 206 may display items in a way that a user will be able to select only the number of children items allowed, etc. This may be applicable for any item, such as attributes and billing offers, etc. This may be accomplished, for example, by EPC enactments or an attribute on a group component that will indicate the number of child items allowed. The user interface 206 may enforce the rules. For example, if only one component can be selected under the group component, the user interface 206 may present radio buttons for the list of components, etc.

As another example, the user may utilize the system 200 to define a guided flow. In this case, the guided flow may define which step an item should be presented. For example, configuration of complex products or multi-products might require a certain business or technical sequence to allow fast flow, to ensure technical parameters are correctly captured, and/or to ensure pricing items are correctly considered (e.g. cross products discounts).

The catalog 204 will allow a user to add steps to each component, and each component may belong to one or more steps in a guided flow. Additionally, the guided flow may be applicable for cross products. Each step may be associated with a step number and a presented name defined in the catalog 204.

Further, one step may be a prerequisite for the other steps negotiation, and the implementer can indicate the dependent steps. The steps will be defined in the catalog 204 as for any other catalog item (e.g. component, product, etc.).

As an example, the system 200 may allow a user to negotiate a quantity of products on a product by product basis, where each product is configured as a standalone product (e.g. Product 1: Step 1 (Name) . . . N (Name), Product 2: Step 1 . . . N, etc.).

Further, the rules may indicate that each step is to be completed before a user may continue to the next step (e.g. Product 1: Step 1, Product 2: Step 1, Product 1: Step 2, Product 2: Step 2, etc.).

The system 200 may allow a user to negotiate multi-products in the same way as quantity products. Step by step negotiation can be done for the multi-products allowing a user to go from one product to another (e.g. Product 1: Step 1, Product 2: Step 1, Product 2: Step 2, Product 2: Step 3, Product 1: Step 5, etc.).

As another example, the user may utilize the system 200 to define a launch of an external widget. For example, a user may define criteria for launching other widgets per definition in the catalog 204.

As another example, the user may utilize the system 200 to define in-context validation. This may allow for updates of the configuration on the fly to ensure the user correctly configures the product (e.g. changes to valid value list, etc.).

As another example, the user may utilize the system 200 to define prerequisites. This allows a user to indicate dependencies between items in the user interface 206 up front. For example, some items may be relevant only if a certain item or value is selected (e.g. hiding the item until the value is selected, etc.). There may be mandatory perquisites (e.g. an item is mandatory when a prerequisite is met) or available prerequisites (e.g. an item may be available when a prerequisite is met). The prerequisites may be associated with components, attributes, values, and/or business offerings, etc.

As an example implementation of the system 200, a new feature "Mobile TV" may be added to a Mobile Product Offering and may include attributes such as "Channel Packages List", "Channels List", "Quality" (HD/SD), "VOD" and others. The business users require that this feature will be presented in the "Quick Setting" step and spotlighted. It should be presented also as part of a "Data Feature" step. The VOD can be selected only when "Premium Channel Package" is selected and "Quality" is relevant. The catalog 204 allows a user to define all the above by defining the right properties mentioned above in the catalog 204. Once the new product is launched, all the usability concepts are already available without any software changes.

Figure 3:
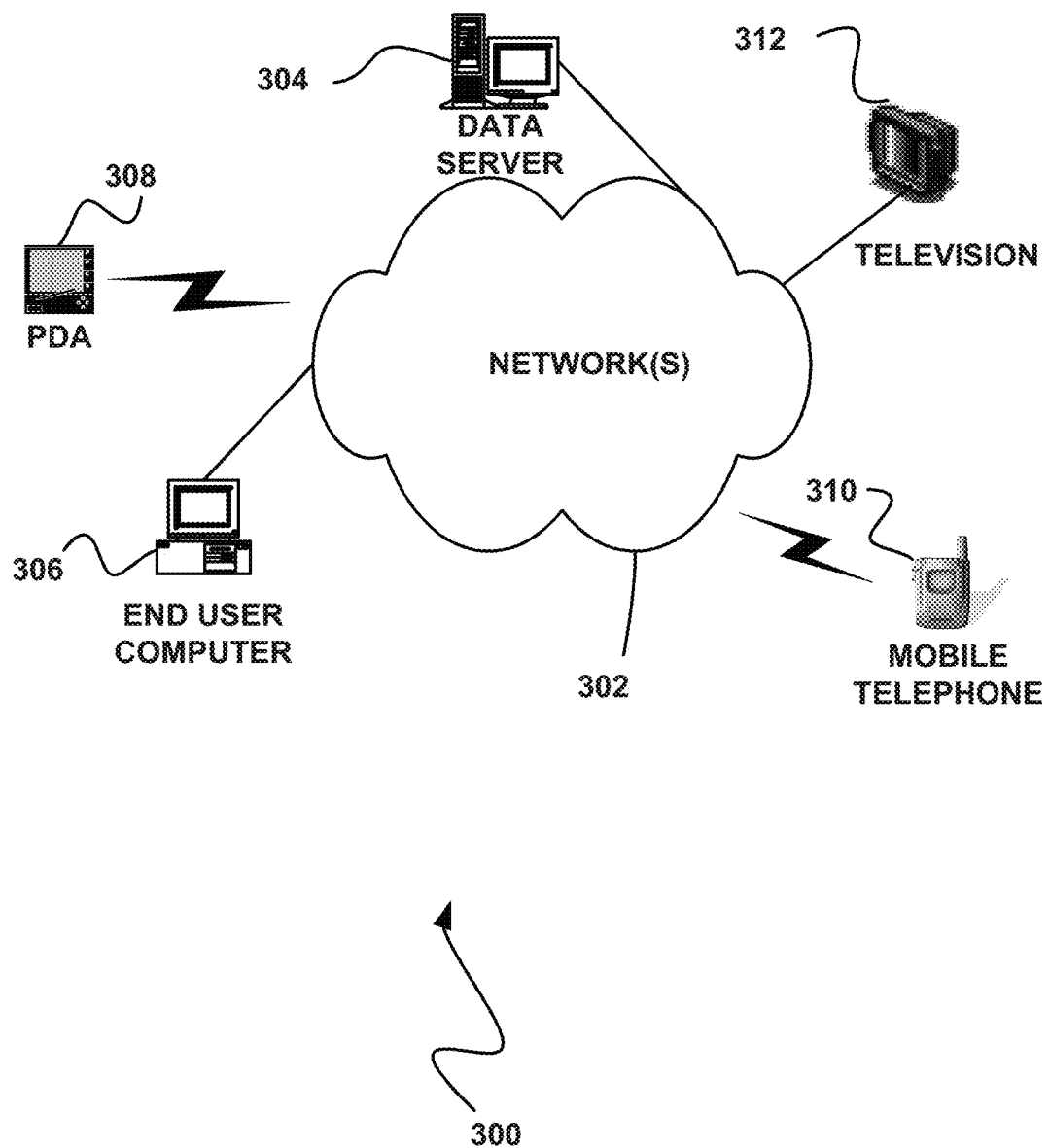
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
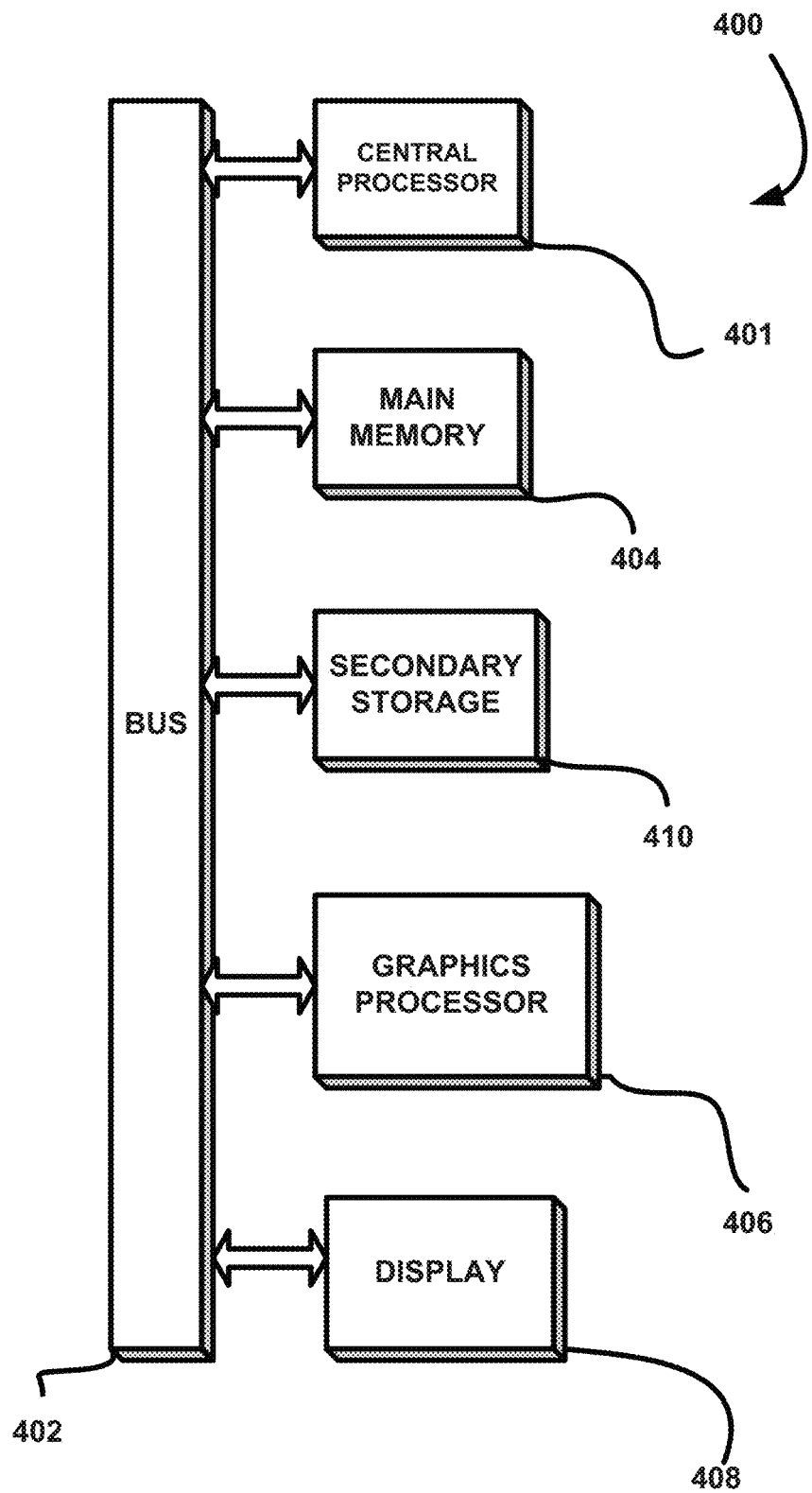
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing code executable by a processor to perform a method, comprising:

storing, by a system in a product catalog, a plurality of entries for products associated with at least one service provider;

storing, by the system in the product catalog, a plurality of dynamically selectable definitions defining how a product is to be presented within at least one user interface, wherein the dynamically selectable definitions include:
  a first dynamically selectable definition that specifies that first information associated with the product is to be presented first and second information is to be presented by request,
  a second dynamically selectable definition that specifies that the product is to be displayed with additional specified products as a selectable group,
  a third dynamically selectable definition that specifies that the product is to be presented during a particular step of a guided flow,
  a fourth dynamically selectable definition that specifies that a catalog rules validation associated with a product configuration is to be called,
  a fifth dynamically selectable definition that specifies to bypass catalog rules for the product in association with a specified channel of the plurality of channels associated with the product, wherein the plurality of channels include a call center channel and a sales center channel, and
  a sixth dynamically selectable definition that specifies to launch a computer program external to the at least one user interface;
for each product of the plurality of products:
  receiving, by the system, selection of at least one definition of the plurality of dynamically selectable definitions, wherein the selection is received separately for each of a plurality of channels associated with the product,
  accessing, by the system, an entry for the product from the plurality of entries for the products in the product catalog, and
  storing, by the system in the product catalog, an indication of each of the selected at least one definition received for the plurality of channels as separate properties of the entry for the product in the product catalog;
determining, by the system, one or more products of the plurality of products to present in the at least one user interface associated with a particular channel of the plurality of channels;
configuring, by the system, the at least one user interface to present each of the one or more products in accordance with the at least one definition indicated in the entry for the product and the particular channel; and
presenting, by the system, the configured at least one user interface for displaying to a user the one or more products in accordance with the at least one definition stored in association with the product in the product catalog.

2. A method, comprising:
storing, by a system in a product catalog, a plurality of entries for products associated with at least one service provider;
storing, by the system in the product catalog, a plurality of dynamically selectable definitions defining how a product is to be presented within at least one user interface, wherein the dynamically selectable definitions include:
  a first dynamically selectable definition that specifies that first information associated with the product is to be presented first and second information is to be presented by request,
  a second dynamically selectable definition that specifies that the product is to be displayed with additional specified products as a selectable group,
  a third dynamically selectable definition that specifies that the product is to be presented during a particular step of a guided flow,
  a fourth dynamically selectable definition that specifies that a catalog rules validation associated with a product configuration is to be called,
  a fifth dynamically selectable definition that specifies to bypass catalog rules for the product in association with a specified channel of the plurality of channels associated with the product, wherein the plurality of channels include a call center channel and a sales center channel, and
  a sixth dynamically selectable definition that specifies to launch a computer program external to the at least one user interface;
for each product of the plurality of products:
  receiving, by the system, selection of at least one definition of the plurality of dynamically selectable definitions, wherein the selection is received separately for each of a plurality of channels associated with the product,
  accessing, by the system, an entry for the product from the plurality of entries for the products in the product catalog, and
  storing, by the system in the product catalog, an indication of each of the selected at least one definition received for the plurality of channels as separate properties of the entry for the product in the product catalog;
determining, by the system, one or more products of the plurality of products to present in the at least one user interface associated with a particular channel of the plurality of channels;
configuring, by the system, the at least one user interface to present each of the one or more products in accordance with the at least one definition indicated in the entry for the product and the particular channel; and
presenting, by the system, the configured at least one user interface for displaying to a user the one or more products in accordance with the at least one definition stored in association with the product in the product catalog.

3. A system, comprising:
a memory system; and
one or more processing cores coupled to the memory system and that are each configured to:
  store, in a product catalog, a plurality of entries for products associated with at least one service provider;
  store, in the product catalog, a plurality of dynamically selectable definitions defining how a product is to be presented within at least one user interface, wherein the dynamically selectable definitions include:
    a first dynamically selectable definition that specifies that first information associated with the product is to be presented first and second information is to be presented by request,
    a second dynamically selectable definition that specifies that the product is to be displayed with additional specified products as a selectable group,
    a third dynamically selectable definition that specifies that the product is to be presented during a particular step of a guided flow, a fourth dynamically selectable definition that specifies that a catalog rules validation associated with a product configuration is to be called, a fifth dynamically selectable definition that specifies to bypass catalog rules for the product in association with a specified channel of the plurality of channels associated with the product, wherein the plurality of channels include a call center channel and a sales center channel, and a sixth dynamically selectable definition that specifies to launch a computer program external to the at least one user interface;

for each product of the plurality of products:

receive selection of at least one definition of the plurality of dynamically selectable definitions, wherein the selection is received separately for each of a plurality of channels associated with the product, access an entry for the product from the plurality of entries for the products in the product catalog, and store, in the product catalog, an indication of each of the selected at least one definition received for the plurality of channels as separate properties of the entry for the product in the product catalog;

determine one or more products of the plurality of products to present in the at least one user interface associated with a particular channel of the plurality of channels;

configure the at least one user interface to present each of the one or more products in accordance with the at least one definition indicated in the entry for the product and the particular channel; and present the configured at least one user interface for displaying to a user the one or more products in accordance with the at least one definition stored in association with the product in the product catalog.

\* \* \* \* \*